(No Model.) 2 Sheets—Sheet 2.
C. T. HOLLOWAY.
COMBINED FIRE ENGINE AND HOSE WAGON.
No. 464,281. Patented Dec. 1, 1891.
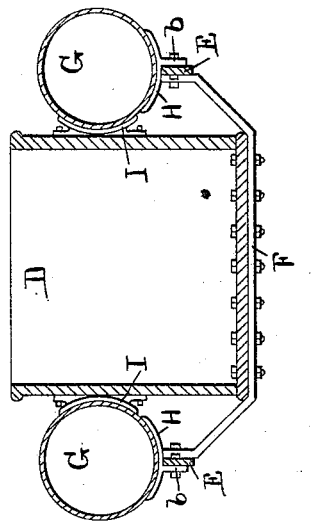
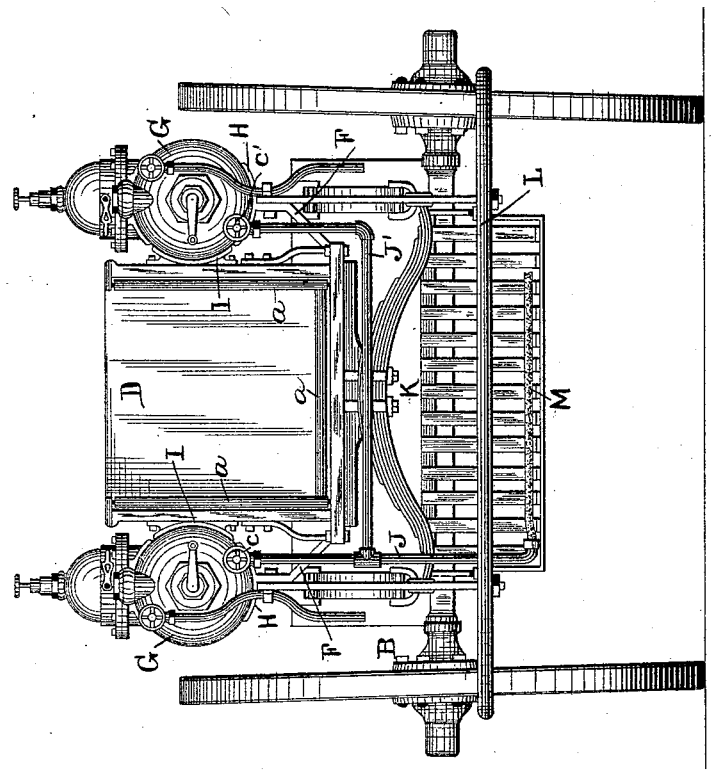
WITNESSES:
Otto H. Ehlers.
F. F. Davis.
INVENTOR
Charles T. Holloway,
BY
Chas B. Mann
ATTORNEY.

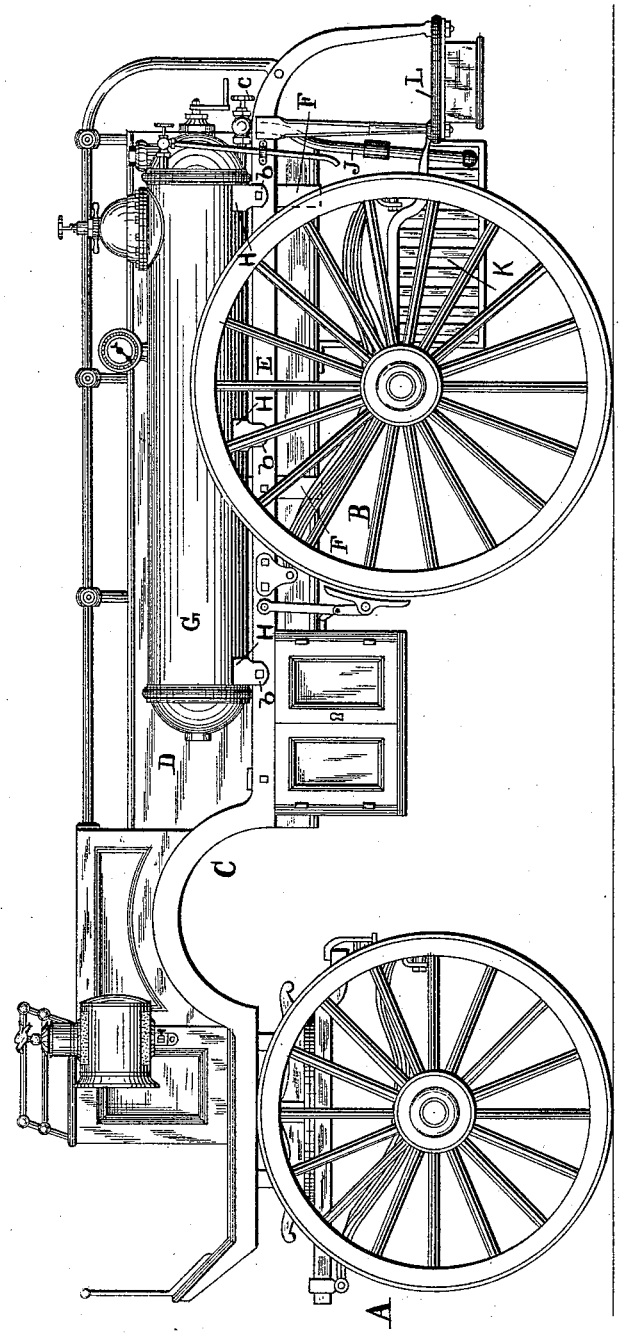

UNITED STATES PATENT OFFICE.

CHARLES T. HOLLOWAY, OF BALTIMORE, MARYLAND.

COMBINED FIRE-ENGINE AND HOSE-WAGON.

SPECIFICATION forming part of Letters Patent No. 464,281, dated December 1, 1891.

Application filed September 9, 1891. Serial No. 405,172. (No model.)

*To all whom it may concern:*

Be it known that I, CHARLES T. HOLLOWAY, a citizen of the United States, residing at Baltimore city, in the State of Maryland, have invented certain new and useful Improvements in Combined Chemical Fire-Engines and Hose-Wagons, of which the following is a specification.

This invention relates to a combined chemical fire-engine and hose-wagon; and the object is to provide a vehicle with a body for carrying water-hose, and also chemical-tanks conveniently located.

With this end in view the invention may be said to consist in the novel features of construction and combinations of parts hereinafter described and claimed.

The invention is illustrated in the accompanying drawings, in which—

Figure 1 illustrates a side view of the vehicle; Fig. 2, a rear end view, and Fig. 3 a cross-section on line 3 3 of Fig. 1.

In the drawings, the letter A designates the front running-gear; B, the rear running-gear, and C the frame of the vehicle, which connects the front and rear running-gear. A body D is hung between the rear portions E of the side bars of this frame and is supported in hangers F, which comprise metal straps extending across the bottom of the body and bolted thereto, said straps bent up on each side and bolted to the side bars E of the frame C. This body D is for containing water-hose, and is provided with rollers $a$ at the rear to facilitate drawing off such hose.

On each side of the body is located a cylindrical tank G, containing the fire-extinguishing chemical, and each tank is mounted in saddles on the frame C. Each saddle comprises a concave plate H, in which the tank seats, said plate resting on the side bar E of the frame C and having a downward-extending lip $b$, by which it bolts to such side bar. A sufficient number of these saddles are provided to properly support each tank, and bearing-plates I are also secured to the sides of the body D and have concave outer faces to receive the tanks. It will be observed that by this arrangement the tanks are securely held and conveniently located. They discharge through pipe J J', one of which J leads from one tank down into a hose-basket K, located in front of the rear step L, where it couples to the chemical-hose M, which is contained in said basket, and the other of which pipes J' leads out of the tank at the opposite side across to the first-named pipe, each of the said discharge-pipes being provided with suitable cocks $c$ $c'$, whereby first one tank and then the other may be discharged.

By constructing the vehicle as described, I am enabled to carry a quantity of water-hose in the body D, and also two chemical-tanks conveniently located and chemical-hose through which said tanks discharge.

Having thus described my invention, what I claim as new, and desire to secure by Letters Patent, is—

1. In a combined chemical-engine and hose-wagon, the combination of suitable running-gear, a frame having side bars, a body between said side bars and supported in hangers secured to the latter, and chemical-tanks located on opposite sides of the said body and mounted in saddles on the side bars of the frame, said tanks having horizontal position alongside the body.

2. In a combined chemical-engine and hose-wagon, the combination of suitable running-gear, a frame having side bars, a body between said side bars and supported in hangers secured to the latter, and chemical-tanks mounted in saddles on the side bars of the frame, said saddles comprising concave plates having downward-extending lips by which they are secured to said side bars.

3. In a combined chemical-engine and hose-wagon, the combination of suitable running-gear, a frame having side bars, a body between said side bars and supported in hangers secured to the latter, said body having concave bearing-plates secured to its sides, and chemical-tanks mounted in saddles on the side bars of the frame and engaging the concave bearing-plates on the wagon-body.

4. In a combined chemical-engine and hose-wagon, the combination of suitable running-gear, a frame having side bars, a body for containing water-hose mounted between said side bars and supported in hangers secured to the latter, chemical-tanks mounted in saddles on the side bars of the frame, a basket for chemical-hose below the wagon-body and tanks, and discharge-pipes leading out of the two tanks to said basket, substantially as described.

In testimony whereof I affix my signature in the presence of two witnesses.

CHARLES T. HOLLOWAY.

Witnesses:
R. H. JOHNS,
ALFRED M. FAIRE.